(12) United States Patent
Beard et al.

(10) Patent No.: US 10,166,890 B1
(45) Date of Patent: Jan. 1, 2019

(54) CLIMATE CONTROLLED CHILD SAFETY SEAT ASSEMBLY

(71) Applicants: Nicholas Beard, Palm Beach Garden, FL (US); Cescily Quinn, Palm Beach Garden, FL (US)

(72) Inventors: Nicholas Beard, Palm Beach Garden, FL (US); Cescily Quinn, Palm Beach Garden, FL (US)

(*) Notice: Subject to any disclaimer, the term of this patent is extended or adjusted under 35 U.S.C. 154(b) by 0 days.

(21) Appl. No.: 15/636,197

(22) Filed: Jun. 28, 2017

(51) Int. Cl.
| | | |
|---|---|---|
| *B60N 2/28* | (2006.01) | |
| *B60N 2/56* | (2006.01) | |
| *A47C 7/74* | (2006.01) | |
| *B62B 9/14* | (2006.01) | |
| *B62B 9/12* | (2006.01) | |

(52) U.S. Cl.
CPC .............. *B60N 2/5657* (2013.01); *A47C 7/74* (2013.01); *A47C 7/744* (2013.01); *B60N 2/2845* (2013.01); *B60N 2/2848* (2013.01); *B62B 9/12* (2013.01); *B62B 9/14* (2013.01)

(58) Field of Classification Search
CPC .. B60N 2/2845; B60N 2/2848; B60N 2/5657; A47C 7/72; A47C 7/74; A47C 7/742; A47C 7/744
USPC ......................................... 297/180.14, 184.13
See application file for complete search history.

(56) References Cited

U.S. PATENT DOCUMENTS

| | | | | |
|---|---|---|---|---|
| 4,314,727 A | * | 2/1982 | Potts ......................... | A47C 7/66 297/184.12 |
| 5,624,156 A | * | 4/1997 | Leal .......................... | A47C 7/72 297/217.4 |
| 5,833,309 A | | 11/1998 | Schmitz | |
| 6,027,137 A | * | 2/2000 | Rura ......................... | A47C 7/66 261/DIG. 3 |
| 6,079,781 A | | 6/2000 | Tilley | |
| 6,106,057 A | * | 8/2000 | Lee .......................... | A47C 7/744 297/180.14 |
| 6,409,206 B1 | * | 6/2002 | Willrich .................... | B62B 9/00 261/DIG. 3 |
| 6,439,521 B1 | * | 8/2002 | Wilson ...................... | B62B 9/00 248/226.11 |
| 7,150,162 B1 | * | 12/2006 | Brunner .................... | B62B 9/00 62/306 |
| D558,467 S | | 1/2008 | Hou et al. | |
| 7,320,223 B1 | | 1/2008 | Dabney et al. | |
| 7,866,743 B1 | * | 1/2011 | Russell ..................... | A47C 7/74 297/180.1 |
| 8,007,043 B1 | * | 8/2011 | Vuong ...................... | B60N 2/28 297/217.3 |
| 8,123,290 B1 | * | 2/2012 | Aiken ....................... | A47C 31/11 297/180.1 |

(Continued)

FOREIGN PATENT DOCUMENTS

| | | | | |
|---|---|---|---|---|
| WO | WO2005047056 | | 5/2005 | |
| WO | WO-2008010209 A2 | * | 1/2008 | ............... B62B 9/14 |
| WO | WO-2014121273 A2 | * | 8/2014 | ............. A47C 7/744 |

*Primary Examiner* — Ryan D Kwiecinski

(57) ABSTRACT

A climate controlled child safety seat assembly for cooling and warming a child positioned in the seat includes a car seat that comprises a base and a handle. A power module is coupled to and is positioned in the base. A plurality of penetrations is positioned through the handle. A plurality of fans is operationally coupled to the power module. Each fan is positioned in a respective penetration. The fans are configured to motivate air over a child who is positioned in the car seat.

13 Claims, 5 Drawing Sheets

(56) References Cited

U.S. PATENT DOCUMENTS

| | | | | |
|---|---|---|---|---|
| 8,870,281 | B1* | 10/2014 | Boone | A47C 7/746 297/180.1 |
| 9,452,769 | B1* | 9/2016 | Williams | B62B 9/102 |
| D799,022 | S * | 10/2017 | Ksiazek | D23/411 |
| 2004/0139754 | A1* | 7/2004 | Kamiya | B60N 2/0244 62/186 |
| 2006/0130490 | A1* | 6/2006 | Petrovski | A47C 7/74 62/3.3 |
| 2009/0277190 | A1* | 11/2009 | Piette | B60H 1/00264 62/56 |
| 2010/0133883 | A1* | 6/2010 | Walker | A47C 7/74 297/180.1 |
| 2010/0164256 | A1* | 7/2010 | Salisbury | A47C 4/286 297/16.2 |
| 2011/0193372 | A1* | 8/2011 | Pizzuto | A47C 1/143 297/16.1 |
| 2012/0228909 | A1* | 9/2012 | Blau | B60N 2/2806 297/238 |
| 2013/0057032 | A1* | 3/2013 | Turnage | A47D 15/00 297/184.13 |
| 2014/0097652 | A1* | 4/2014 | Minkoff | A47C 7/744 297/180.14 |
| 2014/0265462 | A1* | 9/2014 | Fleming | A47C 7/66 297/180.14 |
| 2014/0319886 | A1* | 10/2014 | Coffman | A47D 15/00 297/180.14 |
| 2014/0368003 | A1* | 12/2014 | Squires | A47C 7/744 297/16.2 |
| 2018/0072205 | A1* | 3/2018 | Suarez | B60N 2/28 |

\* cited by examiner

CLIMATE CONTROLLED CHILD SAFETY SEAT ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to child safety seat assemblies and more particularly pertains to a new child safety seat assembly for cooling and warming a child positioned in the seat.

BRIEF SUMMARY OF THE INVENTION

An embodiment of the disclosure meets the needs presented above by generally comprising a car seat that comprises a base and a handle. A power module is coupled to and is positioned in the base. A plurality of penetrations is positioned through the handle. A plurality of fans is operationally coupled to the power module. Each fan is positioned in a respective penetration. The fans are configured to motivate air over a child who is positioned in the car seat.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
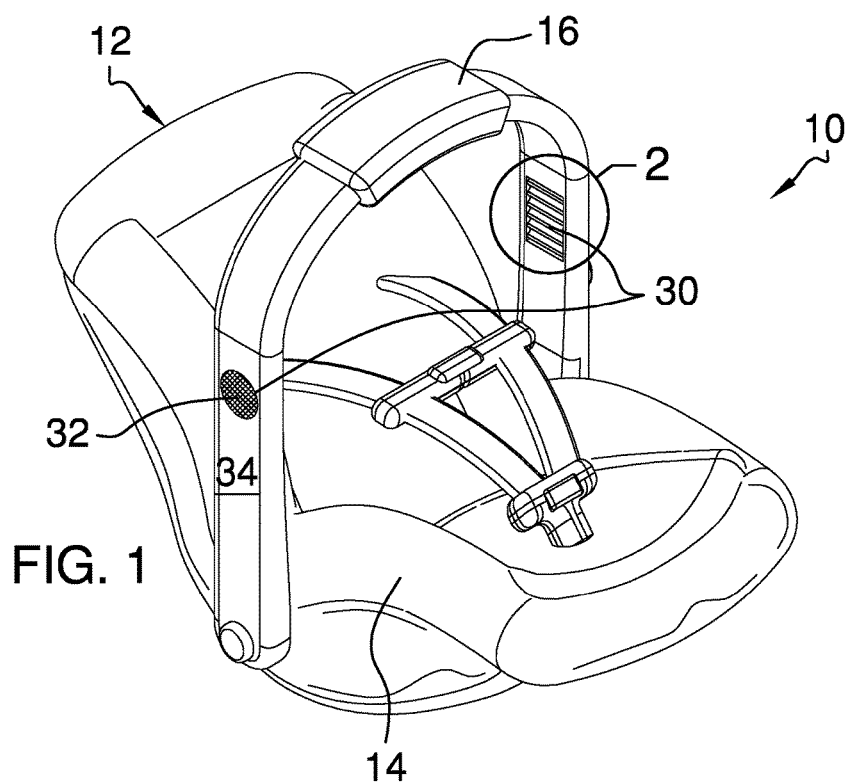
FIG. 1 is an isometric perspective view of a climate controlled child safety seat assembly according to an embodiment of the disclosure.
Figure 2:
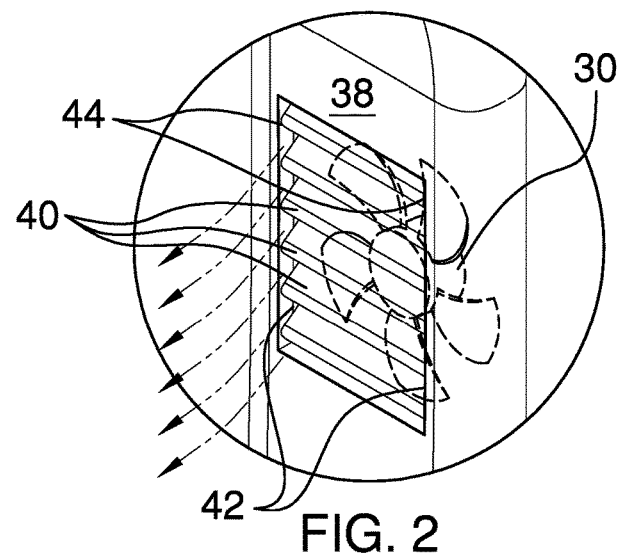
FIG. 2 is a detail view of an embodiment of the disclosure.
Figure 3:
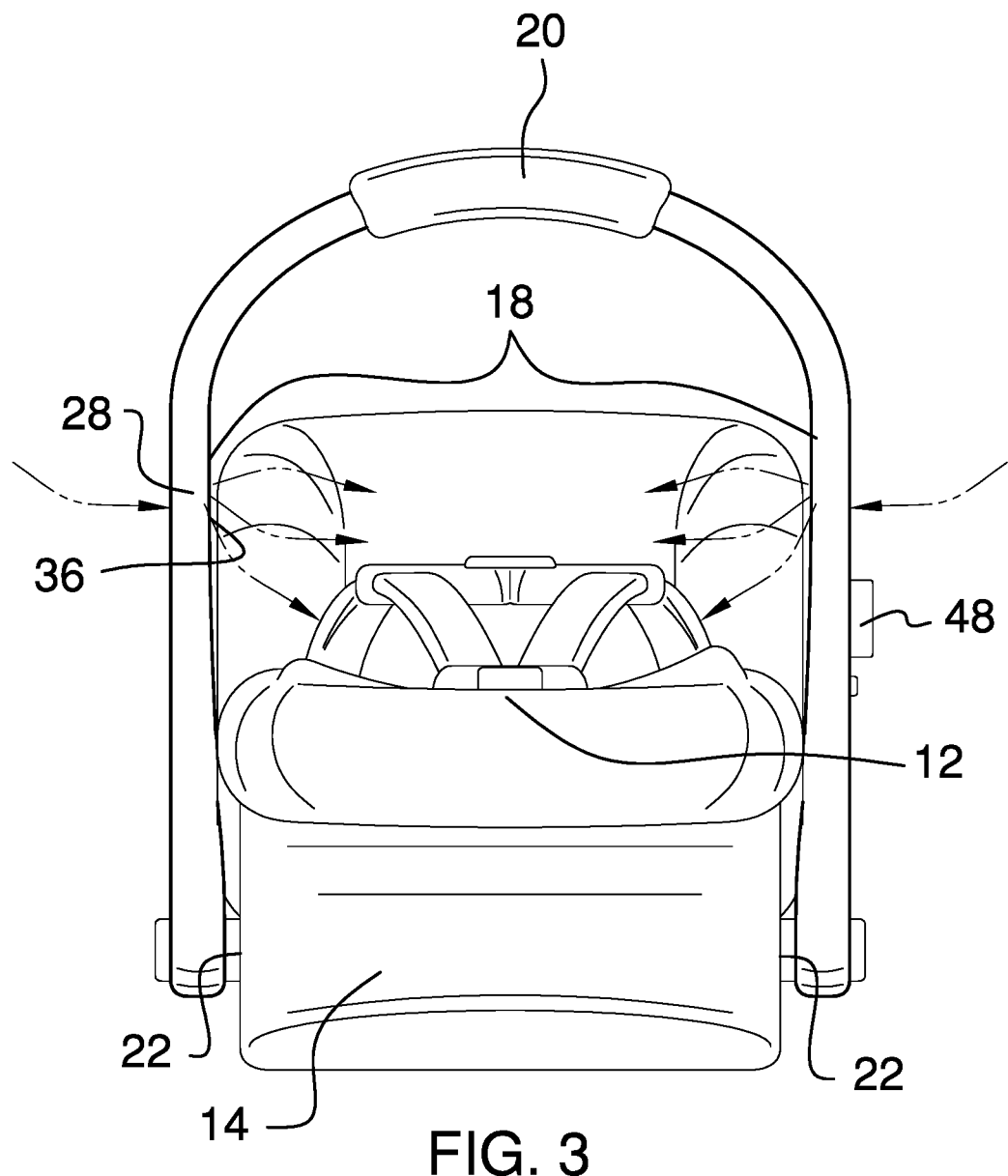
FIG. 3 is a front view of an embodiment of the disclosure.
Figure 4:
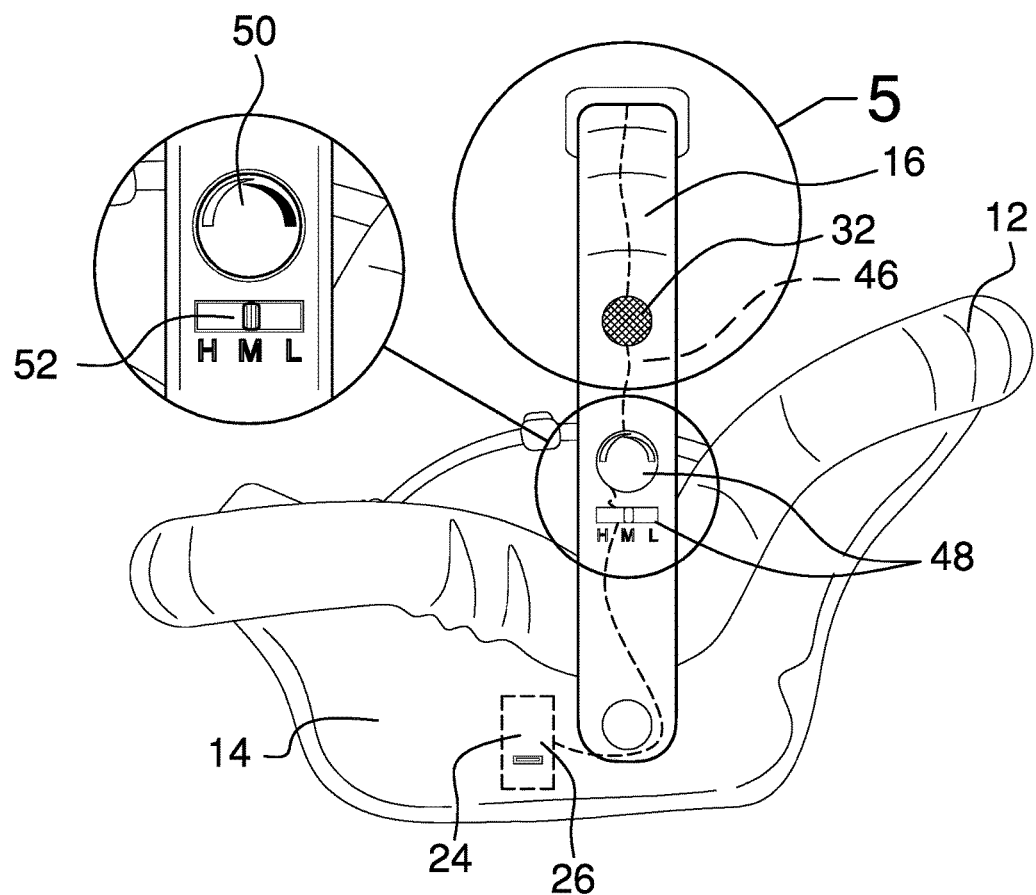
FIG. 4 is a side view of an embodiment of the disclosure.
Figure 5:
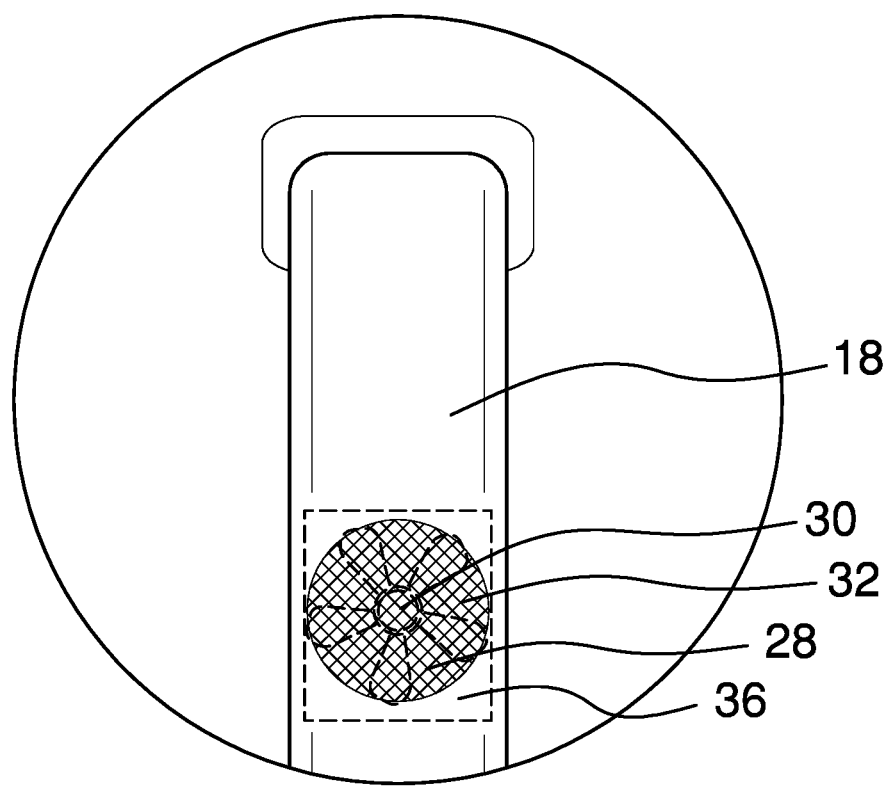
FIG. 5 is a detail view of an embodiment of the disclosure.
Figure 6:
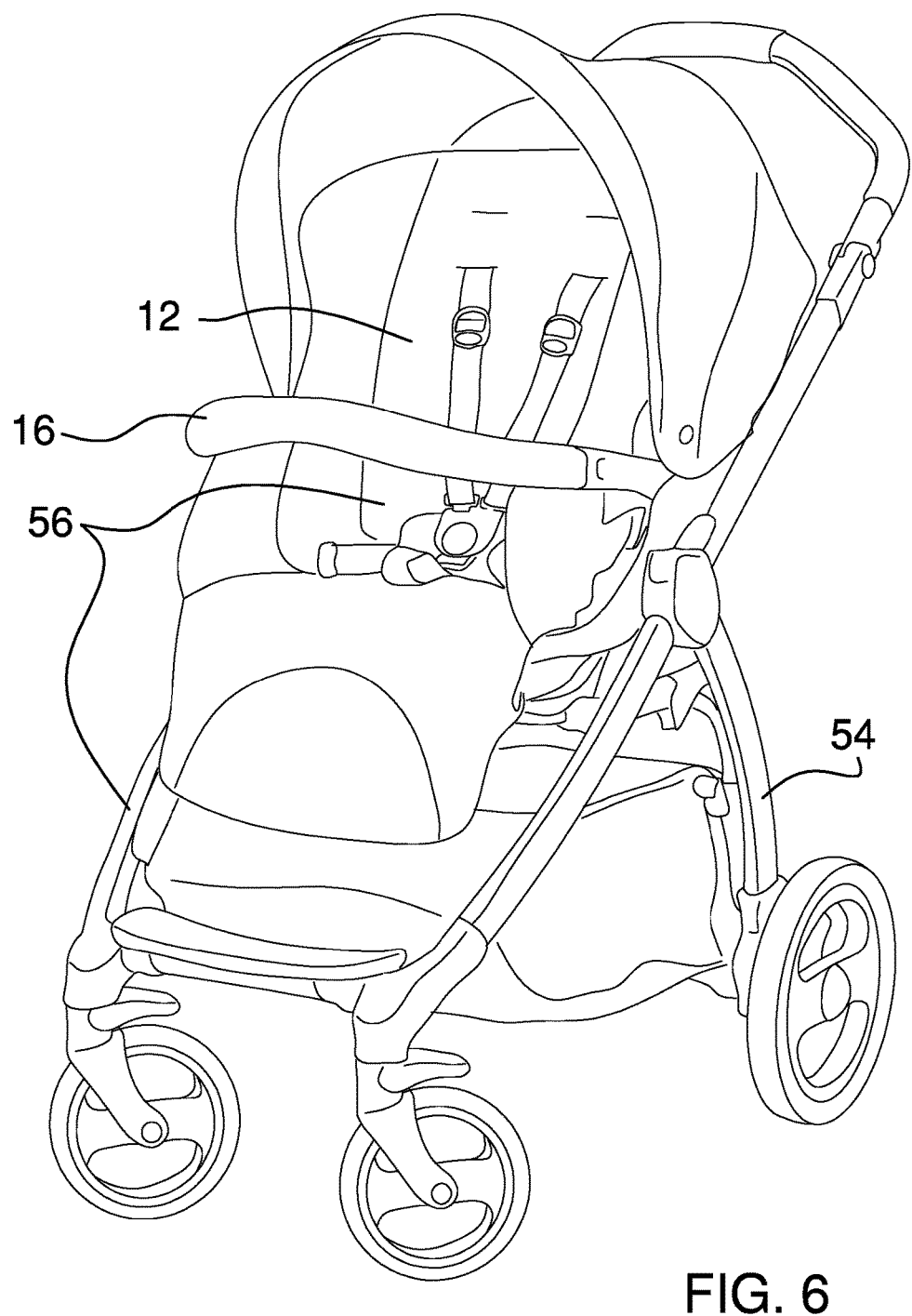
FIG. 6 is a top front side perspective view of an embodiment of the disclosure.

With reference now to the drawings, and in particular to FIGS. 1 through 6 thereof, a new child safety seat assembly embodying the principles and concepts of an embodiment of the disclosure and generally designated by the reference numeral 10 will be described.

As best illustrated in FIGS. 1 through 6, the climate controlled child safety seat assembly 10 generally comprises a car seat 12. The car seat 12 comprises a base 14 and a handle 16. In one embodiment, the handle 16 comprises a pair of arms 18 and a centerpiece 20. Each arm 18 is pivotally coupled to and extends from a respective opposing side 22 of the base 14. The centerpiece 20 is coupled to and extends between the pair of arms 18 distal from the base 14. In another embodiment, the centerpiece 20 is arcuate.

A power module 24 is coupled to and is positioned in the base 14. In one embodiment, the power module 24 comprises at least one rechargeable battery 26. A plurality of penetrations 28 is positioned through the handle 16. A plurality of fans 30 is operationally coupled to the power module 24. Each fan 30 is positioned in a respective penetration 28. The fans 30 are configured to motivate air over a child who is positioned in the car seat 12. In one embodiment, the plurality of fans 30 comprises fans 30 positioned singly in each arm 18.

Each of a plurality of grates 32 is coupled to an outer surface 34 of the handle 16. The grate 32 is positioned to cover an associated penetration 28. Each of a plurality of vents 36 is coupled to an inner surface 38 of the handle 16. The vent 36 is positioned to covering the associated penetration 28. The vents 36 are configured to direct the air over the child who is positioned in the car seat 12. In one embodiment, each vent 36 comprises a plurality of louvers 40. Each louver 40 has opposing ends 42 that are coupled to opposing edges 44 of a respective penetration 28. The plurality of louvers 40 is variably positionable to selectively direct the air over the child who is positioned in the car seat 12.

A plurality of temperature modulators 46 is coupled to the handle 16 and operationally coupled to the power module 24. The temperature modulators 46 are configured to selectively heat and cool air that passes through the penetrations 28. Each temperature modulator 46 is positioned proximate to an associated fan 30.

A control module 48 is coupled to the handle 16. The control module 48 is operationally coupled to the power module 24, the plurality of fans 30, and the plurality of temperature modulators 46. The control module 48 is configured to set a rotational speed of the fans 30 and to compel the temperature modulators 46 to selectively heat and cool the air that passes through the penetrations 28. In one embodiment, the control module 48 comprises a dial 50 and a switch 52. The dial 50 is operationally coupled to the temperature modulators 46. The switch 52 is operationally coupled to the fans 30. The switch 52 has high, medium and low settings.

In one embodiment, the car seat 12 is reversibly couplable to a chassis 54. The car seat 12 is positioned to couple to the chassis 54 so that the car seat 12 and the chassis 54 are configured to function as a stroller 56.

In use, the control module 48 is configured to compel a rotational speed of the fans 30 and to compel the temperature modulators 46 to selectively heat and cool the air that passes through the penetration 28. The fans 30 are configured to motivate the air through the penetrations 28. The plurality of louvers 40 is variably positionable to selectively direct the air over the child who is positioned in the car seat 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A climate controlled child safety seat assembly comprising:
    a car seat comprising a base and a handle, said handle comprising a pair of arms and a centerpiece, each arm of said pair of arms being pivotally coupled to and extending from a respective opposing side of said base, said centerpiece being coupled to and extending between said pair of arms distal from said base;
    a power module coupled to and positioned in said base;
    a plurality of penetrations positioned through said handle;
    a plurality of fans operationally coupled to said power module, each fan of said plurality of fans being positioned in a respective one of said plurality of penetrations, wherein said plurality of fans is positioned in said handle such that said plurality of fans is configured for motivating air over a child positioned in said car seat.

2. The assembly of claim 1 further including said centerpiece being arcuate.

3. The assembly of claim 1 further including said power module comprising at least one rechargeable battery.

4. The assembly of claim 1 wherein each fan of said plurality of fans is positioned singly in each one of said pair of arms.

5. The assembly of claim 1 further including a plurality of grates, each grate of said plurality of grates being coupled to an outer surface of said handle such that each grate of said plurality of grates is positioned for covering an associated one of said plurality of penetrations.

6. The assembly of claim 1 further including a plurality of vents, each vent of said plurality of vents being coupled to an inner surface of said handle such that each vent of said plurality of vents is positioned for covering said associated one of said plurality of penetrations, wherein said vents are positioned on said handle such that said vents are configured for directing the air over the child positioned in said car seat.

7. The assembly of claim 6 further including each one of said plurality of vents comprising a plurality of louvers, each louver of said plurality of louvers having opposing ends coupled to opposing edges of a respective one of said plurality of penetrations such that said plurality of louvers is variably positionable for selectively directing the air over the child positioned in said car seat.

8. The assembly of claim 1 further including said car seat being reversibly couplable to a chassis, wherein said car seat is positioned for coupling to said chassis such that said car seat and said chassis are configured for functioning as a stroller.

9. A climate controlled child safety seat assembly comprising:
    a car seat comprising a base and a handle;
    a power module coupled to and positioned in said base;
    a plurality of penetrations positioned through said handle;
    a plurality of fans operationally coupled to said power module, each fan of said plurality of fans being positioned in a respective one of said plurality of penetrations, wherein said plurality of fans is positioned in said handle such that said plurality of fans is configured for motivating air over a child positioned in said car seat; and
    a plurality of temperature modulators coupled to said handle, each temperature modulator of said plurality of temperature modulators being operationally coupled to said power module, each temperature modulator of said plurality of temperature modulators being configured for selectively heating and cooling air passing through said plurality of penetrations, each temperature modulator of said plurality of temperature modulator being positioned proximate to an associated one of said plurality of fans, wherein said temperature modulators are positioned on said handle such that said temperature modulators are configured for heating and cooling the air passing through said penetrations.

10. The assembly of claim 9 further including a control module coupled to said handle, said control module being operationally coupled to said power module, said plurality of fans and said plurality of temperature modulators, wherein said control module is positioned on said handle such that said control module is configured for setting a rotational speed of said plurality of fans and for compelling said plurality of temperature modulators to selectively heat and cool the air passing through said plurality of penetrations.

11. The assembly of claim 10 further including said control module comprising a dial and a switch, said dial being operationally coupled to said plurality of temperature modulators, said switch being operationally coupled to said plurality of fans, said switch having high, medium and low settings.

12. A climate controlled child safety seat assembly comprising:

a car seat comprising a base and a handle, said handle comprising a pair of arms and a centerpiece, each said arm being pivotally coupled to and extending from a respective opposing side of said base, said centerpiece being coupled to and extending between said pair of arms distal from said base, said centerpiece being arcuate;

a power module coupled to and positioned in said base, said power module comprising at least one rechargeable battery;

a plurality of penetrations positioned through said handle;

a plurality of fans operationally coupled to said power module, each fan of said plurality of fans being positioned in a respective one of said plurality of penetrations, wherein said plurality of fans is positioned in said handle such that said plurality of fans is configured for motivating air over a child positioned in said car seat, wherein each fan of said plurality of fans is positioned singly in each one of said pair of arms;

a plurality of grates, each grate of said plurality of grates being coupled to an outer surface of said handle such that said grate is positioned for covering an associated one of said plurality of penetrations;

a plurality of vents, each vent of said plurality of vents being coupled to an inner surface of said handle such that each vent of said plurality of vents is positioned for covering said associated one of said plurality of penetrations, wherein said plurality of vents is positioned on said handle such that said plurality of vents is configured for directing the air over the child positioned in said car seat, each vent of said plurality of vents comprising a plurality of louvers, each louver of said plurality of louvers having opposing ends coupled to opposing edges of a respective one of said plurality of penetrations such that said plurality of louvers is variably positionable for selectively directing the air over the child positioned in said car seat;

a plurality of temperature modulators coupled to said handle, each temperature modulator of said plurality of temperature modulators being operationally coupled to said power module, each temperature modulator of said plurality of temperature modulators being configured for selectively heating and cooling air passing through said plurality of penetrations, each temperature modulator of said plurality of temperature modulators being positioned proximate to an associated one of said plurality of fans, wherein said plurality of temperature modulators is positioned on said handle such that said plurality of temperature modulators is configured for heating and cooling the air passing through said plurality of penetrations; and a control module coupled to said handle, said control module being operationally coupled to said power module, said plurality of fans and said plurality of temperature modulators, wherein said control module is positioned on said handle such that said control module is configured for setting a rotational speed of said plurality of fans and for compelling said plurality of temperature modulators to selectively heat and cool the air passing through said plurality of penetrations, said control module comprising a dial and a switch, said dial being operationally coupled to said plurality of temperature modulators, said switch being operationally coupled to said plurality of fans, said switch having high, medium and low settings.

13. The assembly of claim 12 further including said car seat being reversibly couplable to a chassis, wherein said car seat is positioned for coupling to said chassis such that said car seat and said chassis are configured for functioning as a stroller.

* * * * *